Dec. 23, 1924.
E. F. NORELIUS
1,520,432
TRACTION ENGINE
Filed July 12, 1915
3 Sheets-Sheet 1
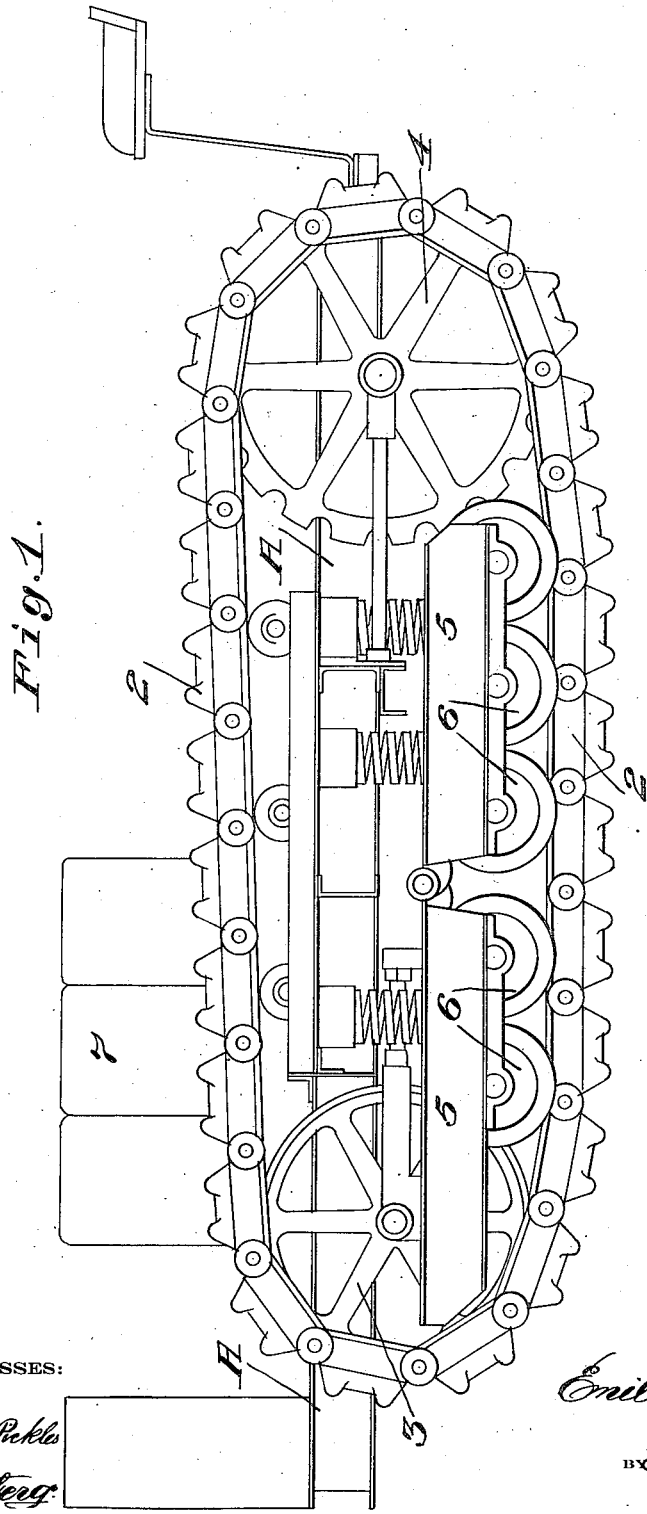

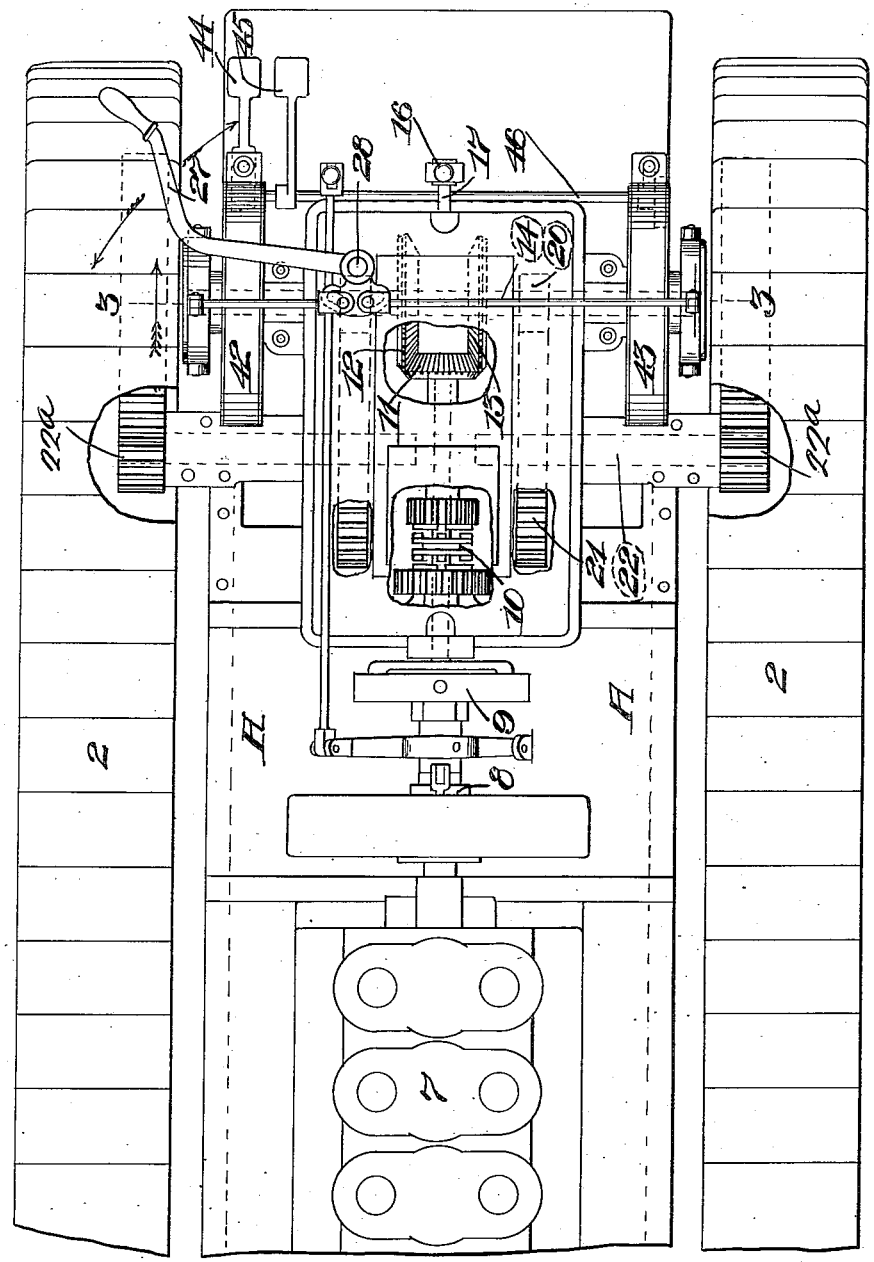

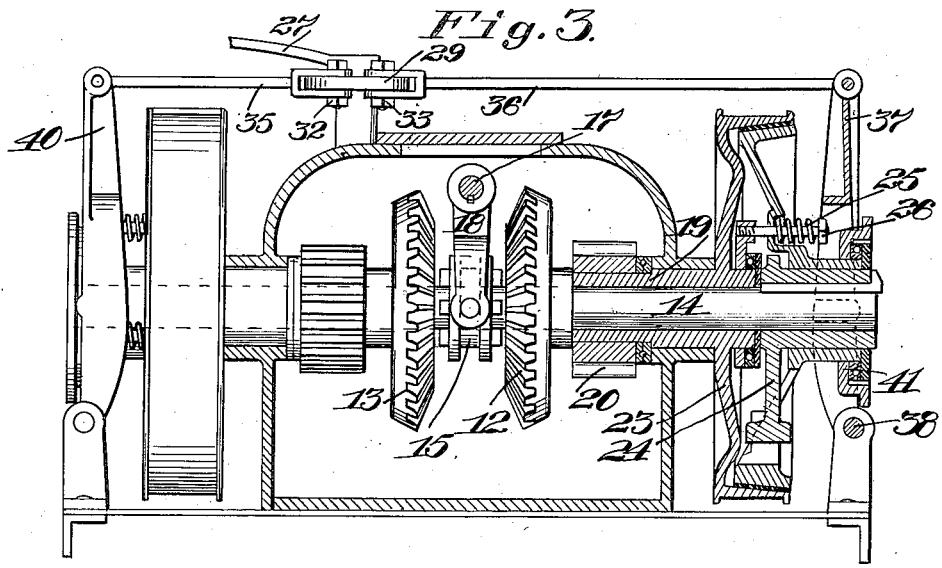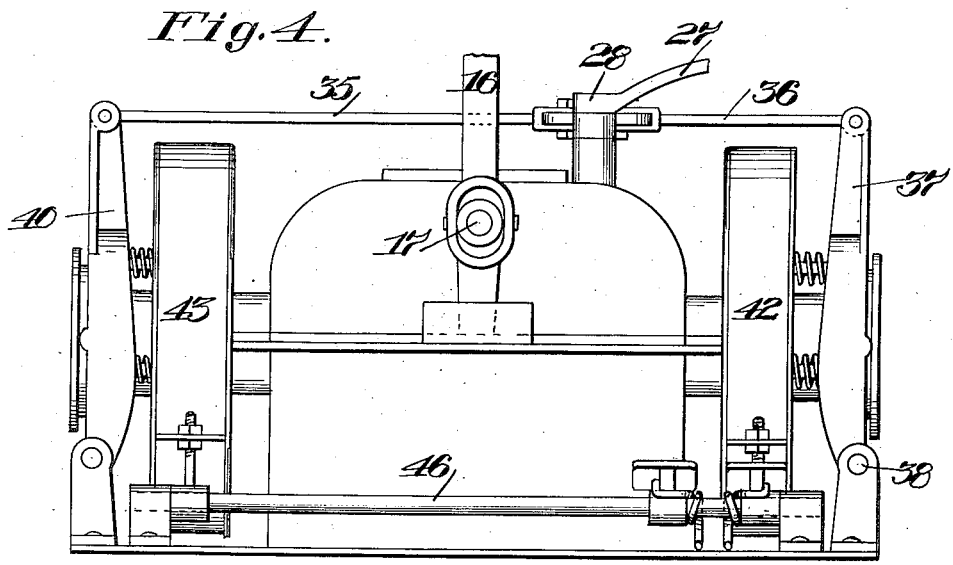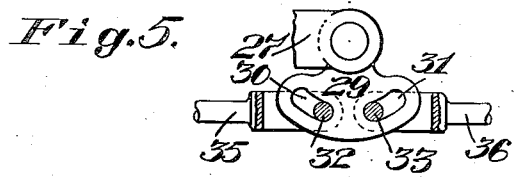

Patented Dec. 23, 1924.

1,520,432

UNITED STATES PATENT OFFICE.

EMIL F. NORELIUS. OF PEORIA, ILLINOIS, ASSIGNOR TO THE HOLT MANUFACTURING COMPANY, OF STOCKTON, CALIFORNIA, A CORPORATION OF CALIFORNIA.

TRACTION ENGINE.

Application filed July 12, 1915. Serial No. 39,402.

*To all whom it may concern:*

Be it known that I, EMIL F. NORELIUS, a citizen of the United States, residing at Peoria, in the county of Peoria and State of Illinois, have invented a new and useful Improvement in Traction Engines, of which the following is a specification.

This invention relates to traction engines and other vehicles of the self-laying track variety such as represented in my co-pending applications #818,837, and #820,504, filed respectively, February 16, 1914, and Feb. 24, 1914; said applications having matured into Letters Patent No. 1,184,007 and No. 1,184,705 respectively, both dated May 23, 1916, the present invention having reference to the means for steering the vehicle and the present application being in the nature of, and in fact a continuation in part of said applications in said respects.

The object of my invention is to provide a simple, practical mode of steering a vehicle of this sort, in which the entire weight of the machine is supported upon a pair of self-laying tracks, the machine dispensing with the usual front steering wheel. A particular object is to effect this steering through the medium of friction clutches interposed in the driving connections, either in connection with suitable brakes, or otherwise; the drive for each track taking place through a respective friction clutch, but allowing either of such clutches to slip. The relative speed of one track to the other track may be varied with fine adjustment by applying a band brake to the released or slipping clutch so that the track normally driven by the latter clutch can be freed from the driving power through its clutch and a shorter turn effected. A further and practical object and advantage is the devising of a means for manipulating the clutches from a single operating lever or hand-wheel; in other words, to allow the steering of one of these big heavy machines to be controlled by one hand, and from a single source of control. Where the steering operation is augmented by the brakes I arrange the latter so that they will be manipulated by a conveniently positioned pedal. The steering mechanism for this tractor is thus controlled through a friction clutch mechanism and a brake mechanism interposed in the drive connections; one of the advantages of this construction being that it enables a machine to be handled without the interposition of a differential gear.

The invention consists of the parts and the construction and combination of parts, as hereinafter more fully described and claimed, having reference to the accompanying drawings, in which—

Fig. 1 is a side elevation of a tractor to which the invention is applied.

Fig. 2 is a plan view of the rear portion of the same.

Fig. 3 is a cross section on line 3—3, Fig. 2.

Fig. 4 is a rear elevation of a portion of the machine, omitting the self-laying tracks and with parts broken away.

Fig. 5 is a detail of a slotted crank used in the steering means.

A is a main frame having its entire weight supported upon two endless, self-laying tracks or traction members 2. These traction members are made up of articulated link sections passing around respective front and rear sprockets 3—4; the load of the frame being carried on trucks 5 which have rollers 6 to run on the track links. Power to operate the traction belts is derived from a suitable motor 7, mounted on the main frame, operating through a clutch 8, universal joint 9, suitable gear shift mechanism 10, and reversing gears 11, 12 and 13; gears 12—13 being mounted loose on a shaft 14. A clutch 15 is operated from an outside lever 16 arranged within convenient reach of the driver through the medium of a rock-shaft 17 and forked crank 18. The shaft 17 has a slight movement for manipulating the gear shift 10, the details of which constitute no part of the present invention.

On each end of shaft 14 is loosely mounted a sleeve 19, carrying a pinion 20 meshing with a corresponding large gear 21, on the shaft 22. The shafts 22 are in turn provided with pinions 22ª in mesh with gears on the opposite ends of the main drive shaft 10, to which the large drive sprockets 4 are fastened. The driving and steering of the vehicle is effected by the interposition of a suitable clutch mechanism between the sleeve 19 and the shaft 14. As here shown, each sleeve 19 is provided with one member 23 of a friction clutch. The other member 24 of the friction clutch is secured to rotate with shaft 14 but has a limited sliding movement thereon so as to be moved into and out of engagement with its complementary member 23. There are two of these sleeves 19 and friction clutches with corresponding driving pinions, one set on one side of the gear 12 and the other set on one side of its respective gear 13. The clutch members 23—24 are normally in driving engagement, being held thereto by springs 25 mounted on studs 26; the studs being anchored in a collar 23ª and the springs exerting an inward pressure on the complementary clutch member 24. Preferably these clutch members are cone-shaped.

With the clutches normally in, power to propel the machine is transmitted equally to each of the rear sprockets 4 and to the tracks so that the machine is driven straight ahead. By manipulating the clutches so that one may be out while the other is in, or allowing one to slip more or less while the other stays in, the steering of the machine is readily accomplished. Preferably the connections for both clutches are arranged and constructed so that a single lever member, as 27, serves to operate either clutch at will.

As here shown, the steering lever 27 is fulcrumed at 28 and carries a crank member 29, having two segmental slots 30—31 to accommodate corresponding pins 32—33 on respective links 35—36; link 36 connecting to a lever 37, fulcrumed at 38 on one side of the machine in juxtaposition to one of the clutches and the other link 35 connecting to a similar lever 40 for operating the other clutch. The levers 37 and 40 are each adapted to move a respective friction clutch member 24 lengthwise of shaft 14 for the purpose of engaging or disengaging one or the other of the clutches. As shown, these levers 37 and 40 are both connected to a respective sliding clutch member 24 through suitable antifriction bearings 41, so that the clutches 24 may turn at all times with shaft 14 and yet be reciprocated on the shaft on the oscillation of the levers 37 or 40.

In operation, it will be seen from the foregoing that by turning the steering lever 27 to the right (Fig. 2) only link 35 will be moved, and as a consequence only the clutch on the left-hand side of the machine will be disengaged or allowed to slip; the clutch on the right-hand side of the machine remaining undisturbed and in full driving connection, so that in proportion to the release of power delivered to the left-hand traction member the machine will turn more or less to the left. To steer to the right, the operation of the steering lever 27 is reversed so as to throw out the clutch on the right, leaving the clutch on the left-hand side in driving connection with its track. The turning or steering movement may be accentuated by applying one or the other of the band brakes 42—43 to the drum on the corresponding clutch member 23; band brake 42 being operated by the foot lever 44 and the brake 43 being operated through the foot lever 45 and appropriate rock-shaft connections 46. These foot levers 44—45 are preferably arranged so as to be within convenient reach of one foot of the operator. The brakes are more particularly used when a short turn is to be made.

It is manifest that various changes in form, proportions and details of construction may be resorted to within the scope of the invention without departing from the spirit or principle of the invention.

Having thus described my invention what I claim and desire to secure by Letters Patent is:

1. In a traction engine the combination with a main frame supported upon a pair of endless, self-laying tracks, a motor and driving connections between the motor and the tracks, said driving connections including a shaft on which is mounted a pair of normally loose gears, means for locking one or the other of the gears to the shaft, a pair of normally loose sleeves on said shaft, a clutch member on each sleeve and a complementary clutch member for each of said sleeve clutch members mounted on said shaft and turnable with said shaft and slidable thereon, means for maintaining the respective clutch members in normal engagement, driving means between the sleeves and the respective track, and means for manipulating the clutches to cause the machine to drive straight ahead or to turn to either side.

2. In a traction engine the combination with a main frame supported upon a pair of endless, self-laying tracks, a motor and driving connections between the motor and the tracks, said driving connections including a shaft, a pair of normally loose sleeves on said shaft, a clutch member on each sleeve and a complementary clutch member for each of said sleeve clutch members mounted on said shaft and turnable with said shaft and slidable thereon, means for maintaining the respective clutch members in normal engagement, driving means between the sleeves and the respective tracks, means for manipulating the clutches to cause the machine to drive straight ahead or to turn to either side, and a pair of band brakes (one for each sleeve) with means for operating each independently, said brake-operating means being also independent of the clutch operating means.

3. In a traction engine, the combination of a main frame mounted upon a pair of flexible, self-laying tracks, driving means for the tracks and friction clutches in the driving means, one friction clutch for each track, automatic means for maintaining the friction clutches normally in, a single control lever for slipping either clutch independently for the purpose of steering the vehicle, a band brake in conjunction with each friction clutch, and means for applying the brakes to augment the steering operation, said brake-operating means being independent of the clutch operating means.

4. In a traction engine, the combination of a main frame mounted upon a pair of self-laying tracks, trucks running on the tracks and supporting said main frame, drive sprockets on the main frame around which a respective track passes, a sprocket shaft, gears on said sprocket shaft, a counter-shaft, sleeves loose on said counter-shaft and each sleeve having a pinion meshing a corresponding gear on the sprocket shaft and each sleeve carrying one member of a friction clutch, a complementary clutch member mounted on the counter-shaft, and turnable with the latter and slidable lengthwise thereon, means for maintaining the complementary clutch members in normal engagement whereby the counter-shaft is coupled to the sprocket shaft, a motor frame and drive connections between the motor and the counter-shaft for operating the latter in either direction, and means for steering the vehicle through a manipulation of the clutch members.

5. In a traction engine, the combination of a main frame mounted upon a pair of self-laying tracks, trucks running on the tracks and supporting said main frame, drive sprockets on the main frame around which a respective track passes, a sprocket shaft, gears on said sprocket shaft, a counter-shaft, sleeves loose on said counter-shaft and each sleeve having a pinion meshing a corresponding gear on the sprocket shaft and each sleeve carrying one member of a friction clutch, a complementary clutch member mounted on the counter-shaft and turnable with the latter and slidable lengthwise thereon, means for maintaining the complementary clutch members in normal engagement whereby the counter-shaft is coupled to the sprocket shaft, a motor frame and drive connections between the motor and the counter-shaft for operating the latter in either direction, a steering member and connections between said steering member and each of the movable friction clutch members constructed and arranged to allow a release of one clutch member when the lever is operated in one direction, and a release of the other clutch member when the lever is operated in the opposite direction.

6. In a traction engine, the combination of a main frame mounted upon a pair of self-laying tracks, trucks running on the tracks and supporting said main frame, drive sprockets on the main frame around which a respective track passes, a sprocket shaft, gears on said sprocket shaft, a counter-shaft, sleeves loose on said counter-shaft and each sleeve having a pinion meshing a corresponding gear on the sprocket shaft and each sleeve carrying one member of a friction clutch, a complementary clutch member mounted on the counter-shaft and turnable with the latter and slidable lengthwise thereon, means for maintaining the complementary clutch members in normal engagement whereby the counter-shaft is coupled between the motor and the counter-shaft for operating the latter in either direction, means for steering the vehicle through a manipulation of the clutch members, and a band brake in conjunction with each clutch with a pair of foot levers connected to the respective band brakes.

In testimony whereof I have hereunto set my hand in the presence of two subscribing witnesses.

EMIL F. NORELIUS.

Witnesses:
ROBERT W. GOTSHALL,
MURRAY M. BAKER.